(No Model.)

P. J. DUGGAN.
REED ORGAN.

No. 245,461. Patented Aug. 9, 1881.

WITNESSES
Helen M. Freegan
Frank G. Parker

INVENTOR
Patrick J. Duggan

UNITED STATES PATENT OFFICE.

PATRICK J. DUGGAN, OF BOSTON, MASSACHUSETTS.

REED-ORGAN.

SPECIFICATION forming part of Letters Patent No. 245,461, dated August 9, 1881.

Application filed May 28, 1881. (No model.)

*To all whom it may concern:*

Be it known that I, PATRICK J. DUGGAN, of Boston, in the county of Suffolk and State of Massachusetts, have invented a new and useful Improvement in Reed-Organs, of which the following is a specification.

The nature of my invention consists in a peculiar arrangement of reeds and reed-chambers, by which any desired number of reeds may be connected with a single exhaust-chamber, and all of the reeds thus connected be equally well supplied with air and all exposed to an equal vacuum. The exact nature may be best understood by reference to the specification and drawings.

Figure 5:
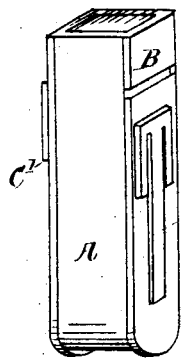
Figure 1:
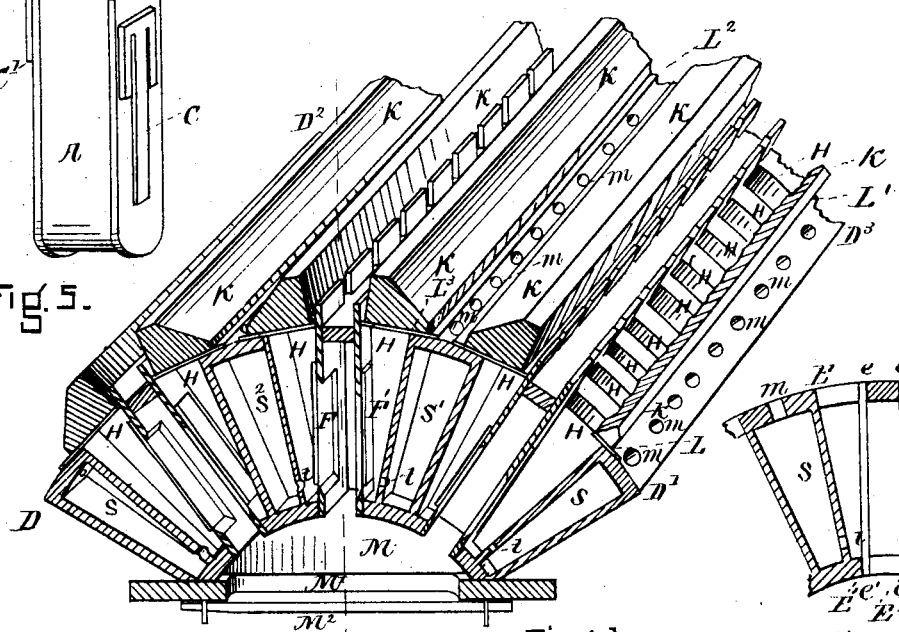
Figure 6:
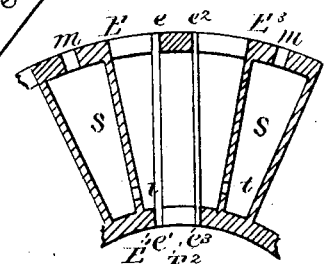
Figure 2:
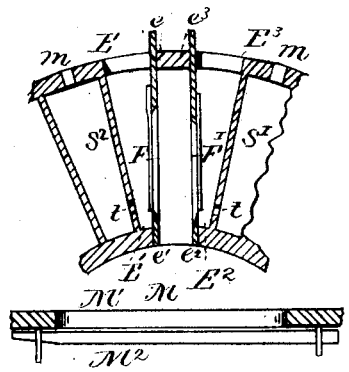
Figure 4:
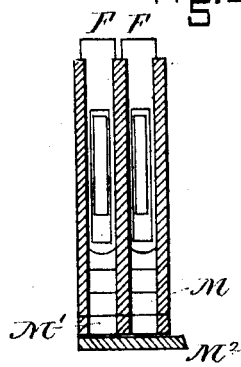
Figure 3:
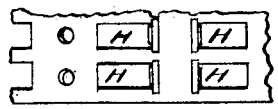

In the drawings, Figure 1 shows a cross-section in connection with a perspective view. Fig. 2 is a section showing one reed-chamber with the two reeds inserted, also showing one of the resounding-chambers. Fig. 3 is a plan of the parts shown in Fig. 2. Fig. 4 is a longitudinal vertical section on line $x\ x$ of Fig. 1. Fig. 5 is a perspective view of one of my double reed boxes or tubes. Fig. 6 is a section similar to that shown in Fig. 2, the reeds being omitted, the reed-channels being shown. This represents, as does Fig. 2, a complete division or section of my reed-board.

I have shown in Fig. 1 a part, $D\ D'\ D^2\ D^3$, of a cylinder which may be built up by uniting thin pieces; or it may be first made solid and then mortised out by machinery. This grouping of wind-chambers about a common center may embrace any desired part of a circle, or even the whole.

Fig. 2 shows a sectional view of a wind-chamber complete, the reed-box $e\ e'\ e^2\ e^3$ being located in its center, as shown.

F and F' represent two reeds which are toned for unison or harmony as may be desired.

The openings H H' of Fig. 2 and H H H, &c., of Fig. 1 extend in a series the whole length of the reed-holder. Each series of openings is covered by a single continuous stop. (See K K.) The stop for the series H H H is represented as though broken off to more clearly show the openings.

A complete division of my reed-board consists of the parts shown in Fig. 2—namely, the wind-chamber $E\ E'\ E^2\ E^3$—the same being shown in Fig. 6, the reeds being omitted and their holding-grooves being shown. A resounding-chamber, S, is connected with each division.

The above complete division constitutes one of a series placed side by side to constitute a longitudinal division which extends the entire length of the device. The longitudinal divisions, one of which is indicated by $L\ L'\ L^2\ L^3$, are arranged circumferentially to form the whole segment $D\ D'\ D^2\ D^3$.

A modification of my system consists in combining the two reeds that belong in one division with an independent box, as shown in Fig. 5, A B representing the box, and C and C' the reeds, one at each side. This box is closed at the top and open at the bottom, as shown. When this modification is to be used in my system the reed-channels at $e\ e'$ and $e^2\ e^3$, Fig. 6, are omitted and a single broad groove wide enough to take the side A of the box is made.

The resounding-chambers $S\ S'\ S^2$, Fig. 1, have small openings $t$ to connect with the reed-chambers and openings $m\ m\ m$ to the open air. The object of these resounding-chambers is to give more power to the sound.

The vacuum-chamber M, of which there is one for each circumferential series of wind-chambers, is provided with a valve-opening, M', and valve $M^2$.

The stops K and the valves $M^2$ are to be operated by any of the well-known devices.

Having thus described my invention, what I desire to secure by Letters Patent is—

1. A musical instrument having the reed-board made in longitudinal divisions or sections, as indicated by $L\ L'\ L^2\ L^3$, each section consisting of a series of wind-chambers, $E\ E'\ E^2\ E^3$, and their reeds F F', arranged in the manner shown and described, said longitudinal section arranged radially as to a common wind chest or receiver, M, all as and for the purpose set forth.

2. In a musical instrument, the combination of the double reed-chambers $E\ E'\ E^2\ E^3$ with the resounding-chamber S, all constructed and arranged substantially as described, and for the purpose set forth.

3. In a musical instrument, the combination of a chamber with a double reed-box, A B, all constructed and arranged substantially as described, and for the purpose set forth.

PATRICK J. DUGGAN.

Witnesses:
HELEN M. FEEGAN,
FRANK G. PARKER.